United States Patent [19]

Dell

[11] 4,369,618

[45] Jan. 25, 1983

[54] SAFETY-VAC LAWN MOWER BLADE

[76] Inventor: Joseph C. Dell, R.D. #1, Box 214B, McConnellsburg, Pa. 17233

[21] Appl. No.: 296,845

[22] Filed: Aug. 27, 1981

[51] Int. Cl.³ .......................................... A01D 55/18
[52] U.S. Cl. ..................................................... 56/295
[58] Field of Search ........................................ 56/295

[56] References Cited

U.S. PATENT DOCUMENTS

| 3,078,573 | 2/1963 | Kern ..................................... 56/295 |
| 3,097,469 | 7/1963 | Belfiore ................................. 56/295 |
| 3,336,737 | 8/1967 | Belfiore ................................. 56/295 |
| 3,392,515 | 7/1968 | Plous .................................... 56/295 |

*Primary Examiner*—Jay N. Eskovitz

[57] ABSTRACT

Safety Rotary Lawnmower Disc Blade that uses vacuum to draw flexible material to the cutting edge but will not suck up rigid materials. Both the vacuum generating element and cutting edge are located on the same side of the disc blade.

4 Claims, 4 Drawing Figures

SAFETY-VAC LAWN MOWER BLADE

This invention relates to cutting blade for rotary lawn mowers.

This invention is a one piece circular steel plate with four more or less tapered slots cut at 90°, 180°, 270°, and 360°, or any other combination of angles. This circular plate can also be made from aluminum, plastic or other suitable material. The length and width of the slots are determined by the width of the mower cut and the RPM of the motor. The trailing edge of the slot is sharpened and does the cutting.

The narrow ends of the tapered slots, which are closest to the shaft, are indented from the bottom side of the plate which raises the metal on the top side of the plate for a length of approximately six inches. These raised portions of the slots create a vacuum which sucks flexible material, such as grass up into the slot where the sharpened edges of the slots cut it. The vacuum will not suck up rigid material such as sticks, fingers, etc, but will pass over them.

Figure 1:
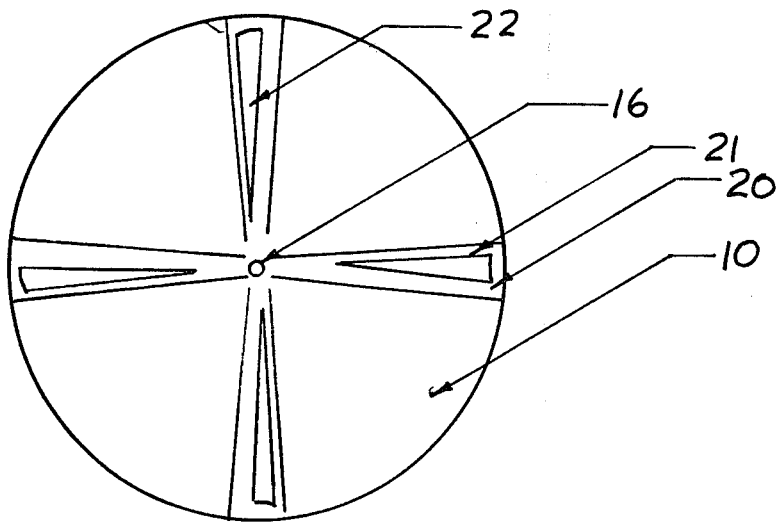
Figure 2:
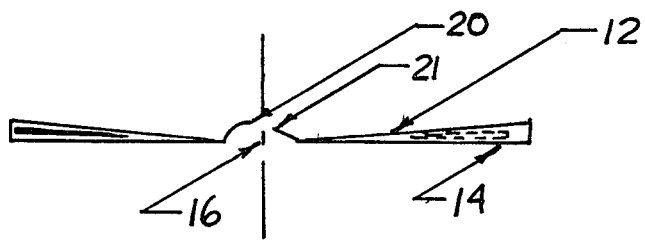
Figure 3:
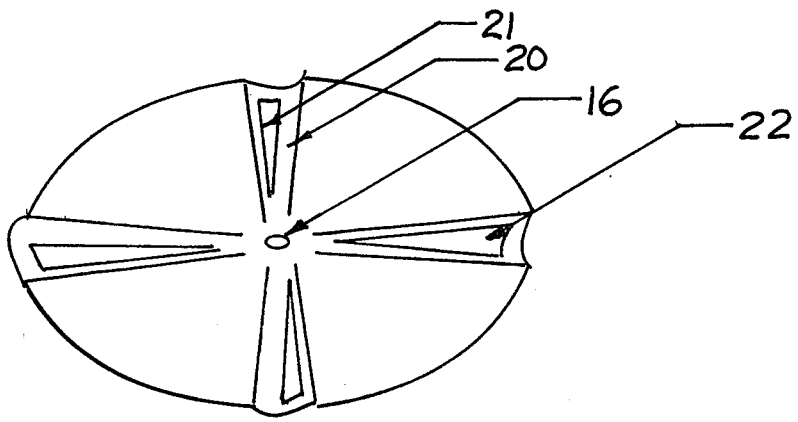
Figure 4:
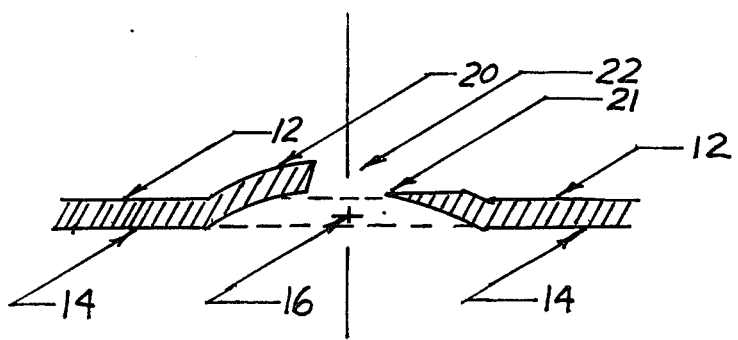

In the accompanying drawing, I have shown a present preferred embodiment of the invention in which:

FIG. 1 is a top view:
FIG. 2 is a side view:
FIG. 3 is an isometric view:
FIG. 4 is an enlargement of portions including #'s 14, 12, 20 and 21.

Referring to the drawings, a safety vac lawn mower disc 10 which will fit any rotary mower has an upper surface 12 and a lower surface 14. A center hole 16 fits over existing shaft on mower motor and is held in place by existing nut on mower shaft (not shown). The slots 22 are raised above the upper surface 12 of the disc 10 creating a foil effect.

Disc 10 is attached to rotary mower through the hole 16. When the mower is running it will rotate the disc 10. This motion of air passing over the rotating foils 20 will create a vacuum effect. This vacuum effect will lift flexible material up to cutting edge 21. More solid material can not be sucked up to the blade edge 21 because the bottom 14 of the disc 10 is moving at a speed that will not allow rigid material time to be vacuumed up and/or this bottom 14 will bump a solid material away from the cutting edge 21.

I claim:

1. A rotary lawn mower blade comprising a circular sheet of material forming a disc adapted to rotate about an axis, said disc having a top plane and a bottom plane, said plaines being parallel to each other, said disc having vortex generating elements thereon extending radially from the axis and axially from one of said planes of said disc, said elements having radial slots or openings therein, said slots or openings having a trailing edge forming the cutting blade, said slots or openings and said cutting blades being on the same axial side of said disc.

2. The structure of claim 1 wherein said vortex generating elements are integrally formed in said disc.

3. The structure of claim 1 wherein said cutting blades are recessed from the other of said disc planes.

4. The structure of claim 1 wherein said cutting blades are recessed in said vortex generating elements.

* * * * *